(12) United States Patent
Elend et al.

(10) Patent No.: US 11,671,455 B2
(45) Date of Patent: Jun. 6, 2023

(54) ETHERNET COMMUNICATIONS DEVICE AND METHOD FOR OPERATING AN ETHERNET COMMUNICATIONS DEVICE

(71) Applicant: NXP B.V., Eindhoven (NL)

(72) Inventors: Bernd Uwe Gerhard Elend, Hamburg (DE); Donald Robert Pannell, Cupertino, CA (US); Steffen Mueller, Hamburg (DE); Philip Axer, Hamburg (DE)

(73) Assignee: NXP B.V., Eindhoven (NL)

( * ) Notice: Subject to any disclaimer, the term of this patent is extended or adjusted under 35 U.S.C. 154(b) by 318 days.

(21) Appl. No.: 16/575,243

(22) Filed: Sep. 18, 2019

(65) Prior Publication Data

US 2021/0084072 A1 Mar. 18, 2021

(51) Int. Cl.
*H04L 29/06* (2006.01)
*H04L 9/40* (2022.01)
*H04L 69/22* (2022.01)

(52) U.S. Cl.
CPC .............. *H04L 63/20* (2013.01); *H04L 63/10* (2013.01); *H04L 63/105* (2013.01); *H04L 63/162* (2013.01); *H04L 69/22* (2013.01)

(58) Field of Classification Search
CPC ..... H04L 63/20; H04L 63/105; H04L 63/162; H04L 63/10; H04L 69/22; H04L 69/323; H04L 69/321
USPC .......................................................... 726/1
See application file for complete search history.

(56) References Cited

U.S. PATENT DOCUMENTS

| 2006/0153238 | A1* | 7/2006 | Bar-On | .... H04L 12/40 370/473 |
| 2006/0198389 | A1* | 9/2006 | Eriokson | .... H04L 47/13 370/466 |
| 2017/0006497 | A1* | 1/2017 | Thu | .... H04L 47/125 |

FOREIGN PATENT DOCUMENTS

WO WO-2015126293 A1 * 8/2015 ............ H04W 12/10

* cited by examiner

*Primary Examiner* — Tu T Nguyen

(57) ABSTRACT

Embodiments of a device and method are disclosed. In an embodiment, an Ethernet communications device includes a physical layer (PHY) unit or a media access control (MAC) unit configured to perform media access control for the Ethernet communications device. The Ethernet communications device includes a security unit configured to manipulate a data stream in a data path within the Ethernet communications device when the data stream violates or conforms to a pre-defined policy.

20 Claims, 3 Drawing Sheets

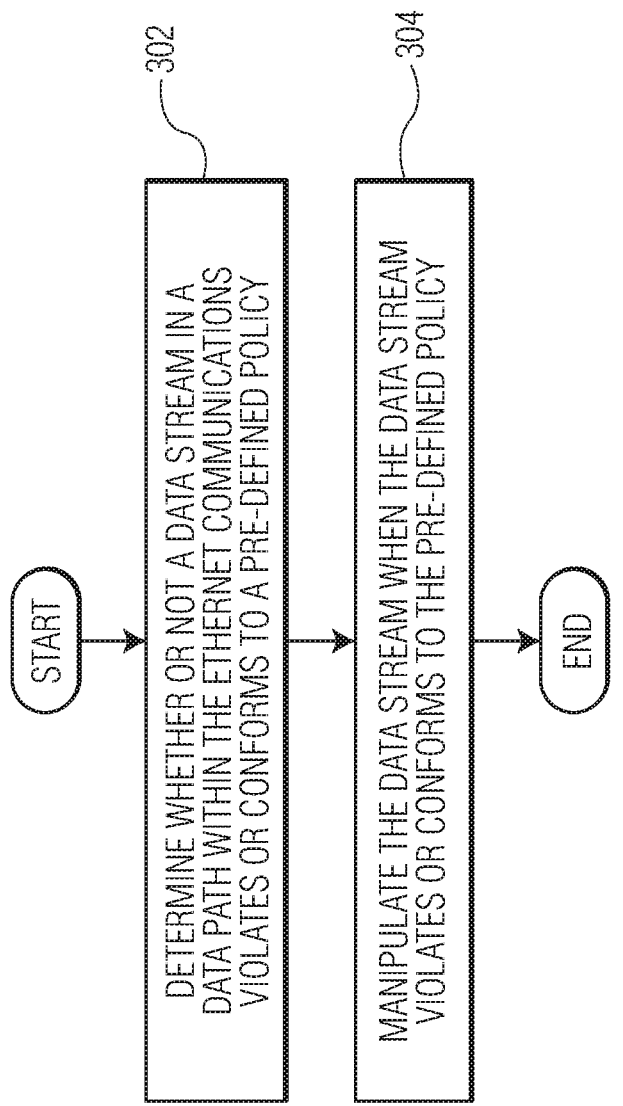

ETHERNET COMMUNICATIONS DEVICE AND METHOD FOR OPERATING AN ETHERNET COMMUNICATIONS DEVICE

BACKGROUND

Ethernet is a well known network technology and the Institute of Electrical and Electronic Engineers (IEEE) 802.3 Working Group is providing a collection of standards that define physical layer and data link layer media access control (MAC) for wired Ethernet. An emerging IEEE standard that may be particularly applicable to in-vehicle networks is IEEE 802.3cg, which is a protocol for 10 Mb/s single twisted-pair Ethernet that enables multiple nodes to connect to the same twisted-pair, also referred to as a "shared media." In an Ethernet network, if a communications node is compromised, the compromised communications node can potentially send spam data or malicious data to other communications node in the Ethernet network and compromise the bandwidth integrity of the Ethernet network. In addition, a compromised communications node can imitate another communications node and/or tamper with frame data content. Therefore, there is a need for an Ethernet communications device that can perform a security function to reduce or prevent misuse of communications bandwidth.

SUMMARY

Embodiments of a device and method are disclosed. In an embodiment, an Ethernet communications device includes a physical layer (PHY) unit or a media access control (MAC) unit configured to perform media access control for the Ethernet communications device. The Ethernet communications device includes a security unit configured to manipulate a data stream in a data path within the Ethernet communications device when the data stream violates or conforms to a pre-defined policy.

In an embodiment, the Ethernet communications device communicates via a shared media.

In an embodiment, the security unit is further configured to extract frame information from the data stream and manipulate the data stream when the frame information violates or conforms to the pre-defined policy.

In an embodiment, the security unit is further configured to compare the frame information with the pre-defined policy.

In an embodiment, the frame information includes frame header information.

In an embodiment, the frame header information includes at least one of a source address, a destination address, port information and frame priority information.

In an embodiment, the security unit is further configured to interrupt transmission of the data stream when the data stream violates or conforms to the pre-defined policy.

In an embodiment, the security unit is further configured to modify the data stream when the data stream violates or conforms to the pre-defined policy.

In an embodiment, the security unit is further configured to receive the pre-defined policy from a media-independent interface (MII) or a secured control channel.

In an embodiment, the security unit is a component of the PHY unit.

In an embodiment, the security unit is a component of the MAC unit.

In an embodiment, the security unit is a component of an MII or a reconciliation sublayer between the PHY unit and the MAC unit.

In an embodiment, a method of operating an Ethernet communications device involves determining whether or not a data stream in a data path within the Ethernet communications device violates or conforms to a pre-defined policy and manipulating the data stream when the data stream violates or conforms to the pre-defined policy.

In an embodiment, the Ethernet communications device communicates via a shared media.

In an embodiment, determining whether or not the data stream violates or conforms to the pre-defined policy includes extracting frame information from data stream and comparing the frame information with the pre-defined policy, and wherein manipulating the data stream when the data stream violates or conforms to the pre-defined policy includes manipulating the data stream when the frame information violates or conforms to the pre-defined policy.

In an embodiment, the frame information includes frame header information.

In an embodiment, the frame header information includes at least one of a source address, a destination address, port information and frame priority information.

In an embodiment, manipulating the data stream when the data stream violates or conforms to the pre-defined policy includes interrupting transmission of the data stream when the data stream violates or conforms to the pre-defined policy.

In an embodiment, manipulating the data stream when the data stream violates or conforms to the pre-defined policy includes modifying the data stream when the data stream violates or conforms to the pre-defined policy.

In an embodiment, a communications network includes a shared media and Ethernet communications devices configured to communicate via the shared media. Each of the Ethernet communications devices includes a PHY unit or a MAC unit configured to perform media access control for the Ethernet communications device. Each of the Ethernet communications devices includes a security unit configured to manipulate a data stream in a data path within the Ethernet communications device when the data stream violates or conforms to a pre-defined policy.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 3 is a process flow diagram of a method of operating an Ethernet communications device in accordance to an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
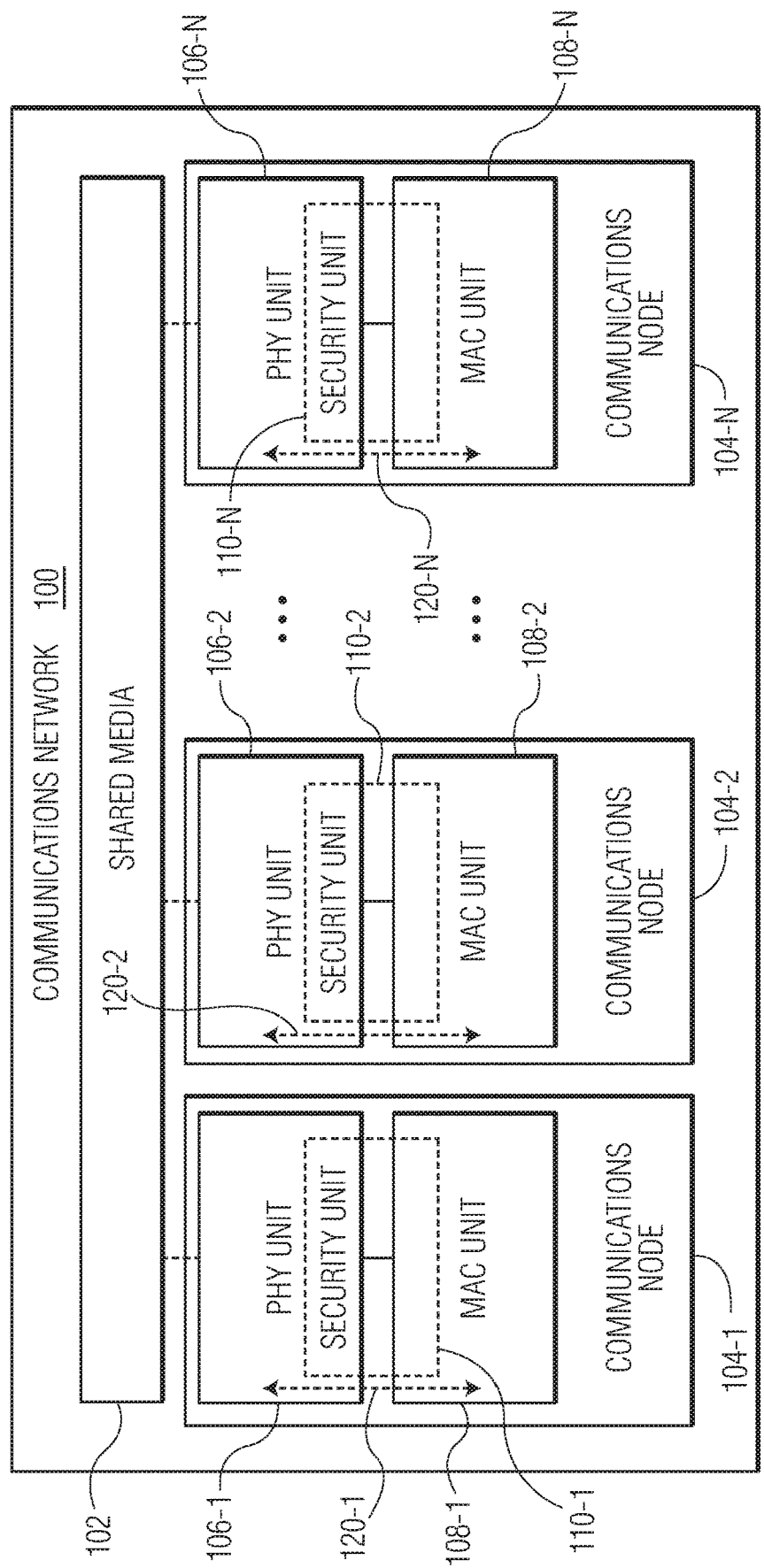
FIG. 1 depicts a communications network that includes multiple communications nodes that communicate through a shared media, such as twisted-pair wires.

FIG. 1 depicts a communications network 100 that includes multiple communications nodes 104-1, 104-2, . . . , 104-N (where N is an integer greater than one) that communicate through a shared media 102, such as twisted-pair wires. In the embodiment of FIG. 1, each communications node includes a corresponding physical layer (PHY) unit 106-1, 106-2, . . . , or 106-N (also referred to as a transceiver) and a corresponding media access control (MAC) unit 108-1, 108-2, . . . , or 108-N configured to perform media access arbitration to orchestrate access to the shared media. In an embodiment, the communications nodes may be end nodes that include, for example, various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The ECUs can communicate with each other in an automobile via in-vehicle network (IVN) technologies such as Ethernet. The communications nodes may also be a node such as an Ethernet bridge. In some embodiments, the communications network is an Ethernet network and the communications nodes are Ethernet communications devices that communicate with each other via the shared media. For example, the communications network is an Ethernet network that utilizes Carrier Sense Multiple Access/Collision Detection (CSMA/CD) for media access control and that is compatible with the IEEE 802.3 standard. Although the illustrated communications nodes are shown with certain components and described with certain functionality herein, other embodiments of the communications nodes may include fewer or more components to implement the same, less, or more functionality. Although the illustrated communications nodes are shown in FIG. 1 as including the PHY units and the MAC units, in some embodiments, at least one of the communications nodes may not include a PHY unit or a MAC unit.

In the embodiment depicted in FIG. 1, the PHY units 106-1, 106-2, . . . , 106-N are configured to manage physical layer communications functions. In some embodiments, the PHY units 106-1, 106-2, . . . , 106-N are configured to manage physical layer communications functions according to the IEEE 802.3cg protocol. For example, the PHY units transmit analog signals onto the shared media and receive analog signals from the shared media. The PHY units may also protect other components in the corresponding communications nodes 104-1, 104-2, . . . , 104-N from extreme electrical conditions, e.g., electrical surges, which may occur on the shared media.

In the embodiment depicted in FIG. 1, the MAC units 108-1, 108-2, . . . , 108-N are configured to perform media access control for the corresponding communications nodes 104-1, 104-2, . . . , 104-N. At least one of the MAC units may be implemented within a processor, such as a microcontroller, a host processor, a host, a digital signal processor (DSP), or a central processing unit (CPU). In some embodiments, at least one of the MAC units is included within the PHY layer module of an IEEE 802.3cg compatible Ethernet communications device. Although the illustrated MAC units are shown in FIG. 1 as included in the corresponding communications nodes, in some embodiments, the MAC units may be separated from the corresponding communications nodes.

In a network with point-to-point connections, there may not be a need for sender authentication since it is evident which node is the sender of a message. However, in the communications network 100 with the shared media 102, any of the communications nodes 104-1, 104-2, . . . , 104-N can be the sender of a message on the shared media. For example, if one of the communications nodes 104-1, 104-2, . . . , 104-N is compromised, the compromised communications node can potentially spam other communications node with unwanted data and compromise the bandwidth integrity of the communications network 100. In addition, a compromised communications node can imitate another communications node and/or tamper with frame data content. In the embodiment depicted in FIG. 1, each communications node includes a security unit 110-1, 110-2, . . . , or 110-N that is configured to manipulate a data stream in a data path 120-1, 120-2, . . . , or 120-N between a corresponding PHY unit 106-1, 106-2, . . . , or 106-N and a corresponding MAC unit 108-1, 108-2, . . . , or 108-N when the data stream violates or conforms to at least one pre-defined policy. The data path may be a receiving data path or a transmission data path. Consequently, when a communications node is compromised, the corresponding security unit within the communications node can prevent the communications node from transmitting spam data or malicious data to other communications node of the communications network. For example, when a communications node is compromised, the corresponding security unit within the compromised communications node may perform truncation of the transmission from the communications node or reduce transmission data rate of the communications node to prevent the compromised communications node from compromising the rest of the communications network. In addition, each communications node within the communications network can use the corresponding security unit within the communications node to monitor external transmissions on the shared media and corrupt a data stream that is transmitted by a compromised communications node but appears to be come from the PHY unit of the communications node (e.g., a data stream that contains an Ethernet header that appears to be sourced from the PHY unit of the communications node), which prevents the compromised communications node from appearing to be the communications node. In some implementations, cryptographic mechanisms are used for sender authentication. However, key distribution and management and synchronization of freshness values at start-up may significantly increase computing power consumption and take up bandwidth. Compared to cryptographic devices with functions such as key distribution and management and synchronization of freshness values, the security units do not need such functions, and consequently, reduce power consumption and bandwidth usage.

In the embodiment depicted in FIG. 1, the security units 110-1, 110-2, . . . , 110-N are located in the data paths 120-1, 120-2, . . . , 120-N within the communications nodes 104-1, 104-2, . . . , 104-N. In some embodiments, the data paths 120-1, 120-2, . . . , 120-N are between the corresponding PHY units 106-1, 106-2, . . . , 106-N and the corresponding MAC units 108-1, 108-2, . . . , 108-N. The security units may be implemented as software, firmware, hardware and a combination of software, firmware, and/or hardware. In some embodiments, at least one of the security units is implemented within a processor, such as a microcontroller, a host processor, a host, a DSP, or a CPU. In some embodiments, at least one of the security units is a component of the corresponding PHY unit, which may be a standalone PHY chip without a MAC unit. For example, in an embodiment, the security unit 110-1 is a component of the corresponding PHY unit 106-1, which may be a standalone PHY chip without a MAC unit. In some other embodiments, at least one of the security units is a component of the corresponding MAC unit, which may be a standalone MAC system on a chip (SoC) without a PHY unit. For example, in an embodiment, the security unit 110-1 is a component of the corresponding MAC unit 108-1, which may be a standalone MAC system on a chip (SoC) without a PHY unit. In some other embodiments, at least one of the security units is a standalone device and is neither a component of the corresponding PHY unit nor a component of the corresponding MAC unit. For example, in an embodiment, the security unit 110-1 is a standalone device and is neither a component of the corresponding PHY unit 106-1 nor a component of the corresponding MAC unit 108-1. In some other embodiments, at least one of the security units is a component of the both corresponding PHY unit and the corresponding MAC unit. For example, in an embodiment, the security unit 110-1 is a component of the corresponding PHY unit 106-1 and the corresponding MAC unit 108-1. In some embodiments, at least one of the security units is configured to receive at least one pre-defined policy from a media-independent interface (MII) or a secured control channel. In some embodiments, at least one of the security units has its own destination address. In some embodiments, at least one of the security units is configured to add and/or verify information carried in a data stream in a data path between a corresponding PHY unit and a corresponding MAC unit that ensures end-to-end integrity of the information conveyed by the data stream.

In some embodiments, at least one of the security units 110-1, 110-2, . . . , 110-N is configured to determine whether or not a data stream in a data path 120-1, 120-2, . . . , or 120-N between a corresponding PHY unit 106-1, 106-2, . . . , or 106-N and a corresponding MAC unit 108-1, 108-2, . . . , or 108-N in violates or conforms to at least one pre-defined policy, for example, by comparing information contained in the data stream with the at least one pre-defined policy, and manipulating the data stream when the data stream violates or conforms to the at least one pre-defined policy. The data path may be a receiving data path or a transmission data path. In some embodiments, at least one of the security units is further configured to extract frame information from a data stream in a data path between a corresponding PHY unit and a corresponding MAC unit and manipulate the data stream when the frame information violates or conforms to at least one pre-defined policy. In an embodiment, at least one of the security units compares the frame information with the pre-defined policy and manipulates the data stream when the frame information violates or conforms to the at least one pre-defined policy. For example, in an embodiment, the security unit 110-1 is configured to extract frame information from a data stream in the data path 120-1 between the corresponding PHY unit 106-1 and the corresponding MAC unit 108-1 and manipulate the data stream when the frame information violates or conforms to at least one pre-defined policy. In some embodiments, the frame information includes frame header information (e.g., header information from an Ethernet frame). Examples of frame information that can be extracted from a data stream include, without being limited to, a source address (e.g., a source Internet Protocol (IP) address), a destination address (e.g., a destination IP address), port information, frame priority information, and virtual Local Area Network (LAN) information.

In some embodiments, at least one of the security units 110-1, 110-2, . . . , 110-N is configured to interrupt or truncate transmission of an outgoing data stream in a transmission data path 120-1, 120-2, . . . , or 120-N between a corresponding PHY unit 106-1, 106-2, . . . , or 106-N and a corresponding MAC unit 108-1, 108-2, . . . , or 108-N if the outgoing data stream violates at least one pre-defined policy. For example, at least one of the security units is configured to corrupt an outgoing data stream (e.g., by corrupting a cyclic redundancy check (CRC) code of an outgoing Ethernet frame) in a transmission data path between a corresponding PHY unit and a corresponding MAC unit if the outgoing data stream violates or conforms to at least one pre-defined policy. By performing security check in a data transmission device instead of performing security check in a data reception device, the possibility that a broken or rogue transmission device misuses communications channel can be reduced or eliminated. For example, when security check is performed in a data reception device, a broken or rogue transmission device can send a large amount of data onto a shared media and corrupt normal data transmissions between other working devices on the shared media. However, when security check is performed in a data transmission device, traffic from a broken or rogue transmission device can be curtailed such that a shared media can be used by other communications nodes. In some embodiments, at least one of the security units is configured to change or modify a data stream in a data path between a corresponding PHY unit and a corresponding MAC unit if the data stream violates or conforms to at least one pre-defined policy. For example, at least one of the security units is configured to perform a bit operation (e.g., bit flipping) a data stream in a data path between a corresponding PHY unit and a corresponding MAC unit if the data stream violates or conforms to at least one pre-defined policy. In yet another example, at least one of the security units is configured to remove or replace VLAN identification number (ID) of an outgoing Ethernet frame an outgoing data stream in a transmission data path between a corresponding PHY unit and a corresponding MAC unit when the outgoing Ethernet frame violates at least one pre-defined policy.

Figure 2:
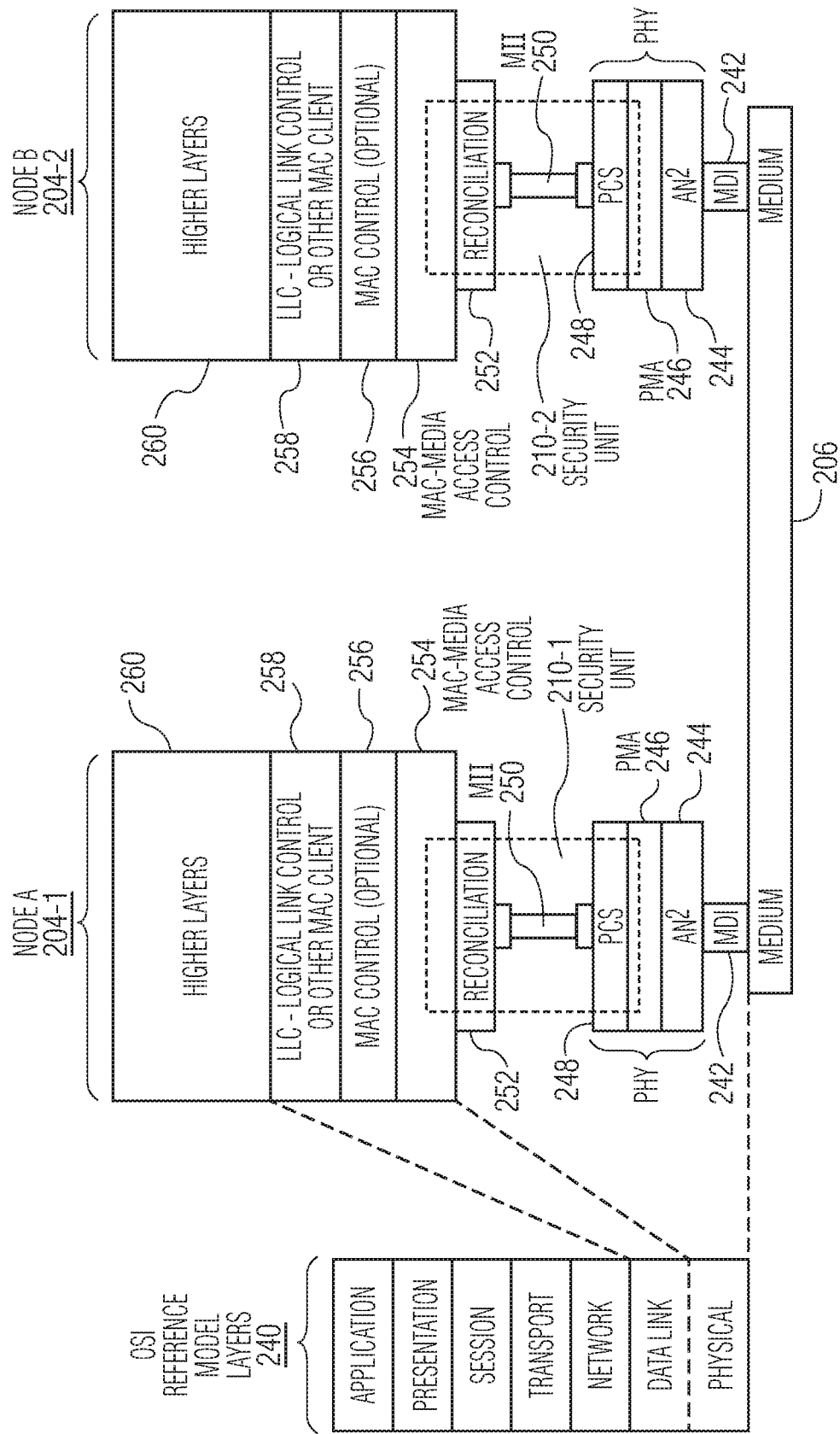
FIG. 2 illustrates an Ethernet communications network and an OSI reference model.

FIG. 2 illustrates an Ethernet communications network that includes two communications nodes, node A 204-1 and node B 204-2, which can be used in an Ethernet based in-vehicle network that is, for example, compatible with IEEE 802.3cg. FIG. 2 also depicts the layers of the OSI reference model 240 as well as an expanded view of the physical layer and the data link layer. As shown in FIG. 2, the OSI reference model includes the physical layer (also referred to as layer 1 or L1), the data link layer (also referred to as layer 2 or L2), the network layer (also referred to as layer 3 or L3), the transport layer (also referred to as layer 4 or L4), the session layer (also referred to as layer 5 or L5), the presentation layer (also referred to as layer 6 or L6), and the application layer (also referred to as layer 7 or L7). Elements in the expanded view of the physical layer include media-dependent sublayers of a transmission medium 206, a media-dependent interface (MDI) 242, an auto-negotiation layer (AN2) 244, a physical medium attachment (PMA) 246, and a physical coding sublayer (PCS) 248, and media-independent sublayers of a media-independent interface (MII) 250, and a reconciliation sublayer 252. In an embodiment, elements of the PCS, PMA, and AN2 are included in a physical layer chip, often referred to as a "PHY chip" and or simply as a "PHY" as indicated in FIG. 2. Elements in the expanded view of the data link layer include a media access control (MAC) layer 254, an optional MAC control layer 256, and a logical link control (LLC) 258, or other MAC client layer. Higher layers 260 may be implemented above the data link layer. In the embodiment depicted in FIG. 2, node A 204-1 includes a corresponding security unit 210-1 and node B 204-2 includes a corresponding security unit 210-2. Each of the security units 210-1, 210-2 may be implemented in the physical layer and/or the data link layer. For example, each of the security units may be implemented in the PMA 246, the PCS 248, the MII 250, and/or the reconciliation sublayer 252.

FIG. 3 is a process flow diagram of a method of operating an Ethernet communications device in accordance to an embodiment of the invention. According to the method, at block 302, whether or not a data stream in a data path between a PHY unit of the Ethernet communications device and a MAC unit of the Ethernet communications device violates or conforms to a pre-defined policy is determining. At block 304, the data stream is manipulated case that the data stream violates or conforms to the pre-defined policy. The Ethernet communications device may be similar to, the same as, or a component of the communications nodes 104-1, 104-2, . . . , 104-N depicted in FIG. 1, node A 204-1 depicted in FIG. 2, and/or node B 204-2 depicted in FIG. 2.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An Ethernet communications device comprising:
   a physical layer (PHY) unit; or
   a media access control (MAC) unit configured to perform media access control for the Ethernet communications device;
   wherein the Ethernet communications device comprises a security unit configured to:
   extract frame header information from a data stream in a data path within the Ethernet communications device;
   determine whether the data stream violates or conforms to a pre-defined policy determining whether the frame header information violates or conforms to the pre-defined policy; and
   output a modified data stream by altering the data stream in the data path within the Ethernet communications device based on whether the data stream violates or conforms to the pre-defined policy;
   wherein altering the data stream in the data path includes:
   altering a virtual local-area-network identifier (VLAN ID) in the frame header information; or
   altering cyclic redundant checksum (CRC) information in the data stream.

2. The Ethernet communications device of claim 1, wherein the Ethernet communications device communicates via a shared media.

3. The Ethernet communications device of claim 1, wherein the security unit is further configured to interrupt transmission of the data stream when the data stream violates or conforms to the pre-defined policy.

4. The Ethernet communications device of claim 1, wherein the security unit is further configured to modify the data stream when the data stream violates or conforms to the pre-defined policy.

5. The Ethernet communications device of claim 1, wherein the security unit is further configured to receive the pre-defined policy from a media-independent interface (MII) or a secured control channel.

6. The Ethernet communications device of claim 1, wherein the security unit is a component of the PHY unit.

7. The Ethernet communications device of claim 1, wherein the security unit is a component of the MAC unit.

8. The Ethernet communications device of claim 1, wherein the security unit is a component of a media-independent interface (MII) or a reconciliation sublayer between the PHY unit and the MAC unit.

9. The Ethernet communications device of claim 1, wherein the data stream is altered by altering VLAN ID in the frame header information.

10. The Ethernet communications device of claim 1, wherein the data stream is altered by altering the CRC information in the data stream.

11. A method of operating an Ethernet communications device, the method comprising:
- determining whether or not a data stream in a data path within the Ethernet communications device violates or conforms to a pre-defined policy;
- outputting a modified data stream by altering the data stream based on whether the data stream violates or conforms to the pre-defined policy; and
- transmitting the modified data stream to one or more other communications devices instead of the data stream;
- wherein determining whether or not the data stream violates or conforms to the pre-defined policy comprises extracting frame header information from data stream and comparing the frame header information with the pre-defined policy, and wherein altering the data stream when the data stream violates or conforms to the pre-defined policy comprises altering the data stream when the frame information violates or conforms to the pre-defined policy; and
- wherein altering the data stream in the data path includes:
  - altering a virtual local-area-network identifier (VLAN ID) in the frame header information; or
  - altering cyclic redundant checksum (CRC) information in the data stream.

12. The method of claim 11, wherein the Ethernet communications device communicates via a shared media.

13. The method of claim 11, wherein the frame header information comprises at least one of a source address, a destination address, port information and frame priority information.

14. The method of claim 11, wherein altering the data stream when the data stream violates or conforms to the pre-defined policy comprises interrupting transmission of the data stream when the data stream violates or conforms to the pre-defined policy.

15. The method of claim 11, wherein altering the data stream when the data stream violates or conforms to the pre-defined policy comprises modifying the data stream when the data stream violates or conforms to the pre-defined policy.

16. The method of claim 11, wherein the data stream is altered by altering the VLAN ID in the frame header information.

17. The method of claim 11, wherein the data stream is altered by altering the CRC information in the data stream.

18. A communications network comprising:
- a shared communication medium; and
- a plurality of Ethernet communications devices configured to communicate via the shared communication medium, wherein each of the Ethernet communications devices comprising:
  - a physical layer (PHY) unit; or
  - a media access control (MAC) unit configured to perform media access control for the Ethernet communications device,
- wherein each of the Ethernet communications devices comprises a security unit configured to:
  - extract frame header information from a data stream in a data path within the Ethernet communications device;
  - determine whether the data stream violates or conforms to a pre-defined policy by determining whether the frame header information violates or conforms to the pre-defined policy;
  - output a modified data stream by altering the data stream based on whether the data stream violates or conforms to the pre-defined policy; and
  - transmit the modified data stream to one or more of the plurality of Ethernet communications device in place of the data stream;
- wherein altering the data stream in the data path includes:
  - altering a virtual local-area-network identifier (VLAN ID) in the frame header information; or
  - altering cyclic redundant checksum (CRC) information in the data stream.

19. The communications network of claim 18, wherein the data stream is altered by altering VLAN ID in the frame header information.

20. The communications network of claim 18, wherein the data stream is altered by altering the CRC) information in the data stream.

* * * * *